(12) United States Patent
Lai

(10) Patent No.: US 6,284,026 B1
(45) Date of Patent: Sep. 4, 2001

(54) FILTERING, WATER ELIMINATING, AND LUBRICATING COMPRESSED AIR VALVE STRUCTURE

(75) Inventor: Wu-Lang Lai, Yenpu Hsiang (TW)

(73) Assignee: Chih-Ming Ting, Taipei (TW)

( * ) Notice: Subject to any disclaimer, the term of this patent is extended or adjusted under 35 U.S.C. 154(b) by 0 days.

(21) Appl. No.: 09/430,755

(22) Filed: Oct. 29, 1999

(51) Int. Cl.[7] .................................................. B01D 46/46
(52) U.S. Cl. ........................ 96/416; 55/310; 55/313; 55/319; 55/385.1; 55/482; 55/DIG. 17
(58) Field of Search ................. 96/400, 416; 55/385.1, 55/467, 482, 319, 320, 309, 310, 312, 313, DIG. 17

(56) References Cited

U.S. PATENT DOCUMENTS

| | | | |
|---|---|---|---|
| 1,652,309 | * 12/1927 | Kingdon | 55/DIG. 17 |
| 2,010,456 | * 8/1935 | Jones | 55/DIG. 17 |
| 2,127,746 | * 8/1938 | Logan | 55/DIG. 17 |
| 2,572,311 | * 10/1951 | Burd | 55/DIG. 17 |
| 2,962,119 | * 11/1960 | White | 55/309 |
| 3,130,741 | * 4/1964 | Vetere | 55/DIG. 17 |
| 3,665,684 | * 5/1972 | White | 55/385.1 |
| 4,400,187 | * 8/1983 | Lane | 55/DIG. 17 |
| 4,464,186 | * 8/1984 | Mann | 55/DIG. 17 |
| 4,810,272 | * 3/1989 | Overby | 55/DIG. 17 |
| 5,522,910 | * 6/1996 | Fogal, Sr. | 55/DIG. 17 |
| 5,637,125 | * 6/1997 | Amada | 55/385.1 |
| 6,093,227 | * 7/2000 | Benasutti | 55/DIG. 17 |

* cited by examiner

Primary Examiner—Duane S. Smith
(74) Attorney, Agent, or Firm—Rabin & Champagne, P.C.

(57) ABSTRACT

A filtering, water eliminating and lubricating compressed air valve structure includes a compact air valve installed between a conventional air compressor and a pneumatic tool. A filter element is positioned inside the air inlet fitting of the compact air valve and, after a transparent condensate chamber is installed over the air inlet fitting, a washer mount and a filter ring are inserted over the bottom of a cross-shaped annular connector, at the bottom of which is a hollow neck that is in continuity with its tubular circumferential wall. A plurality of passages in the lower circumferential end of the hollow neck are disposed in continuity with a throat at the top and a threaded hole, enabling the installation of an lubricating oil reservoir on the upper half of the cross-shaped annular connector. A threaded connector fitting is situated above the throat at the top and, furthermore, an oil feed hole is drilled into the threaded section of the threaded connector fitting that is in continuity with its center bore. A relief needle valve and an oil injection screw are installed in the lower end of the condensate chamber and the upper extent of the oil reservoir, respectively. When air enters the compressed air valve, free-floating particulate matter present in the air is screened and water is filtered out o dry the air, which is then mixed with lubricating oil to lubricate the components of the pneumatic tool and enhancing its operation.

3 Claims, 5 Drawing Sheets

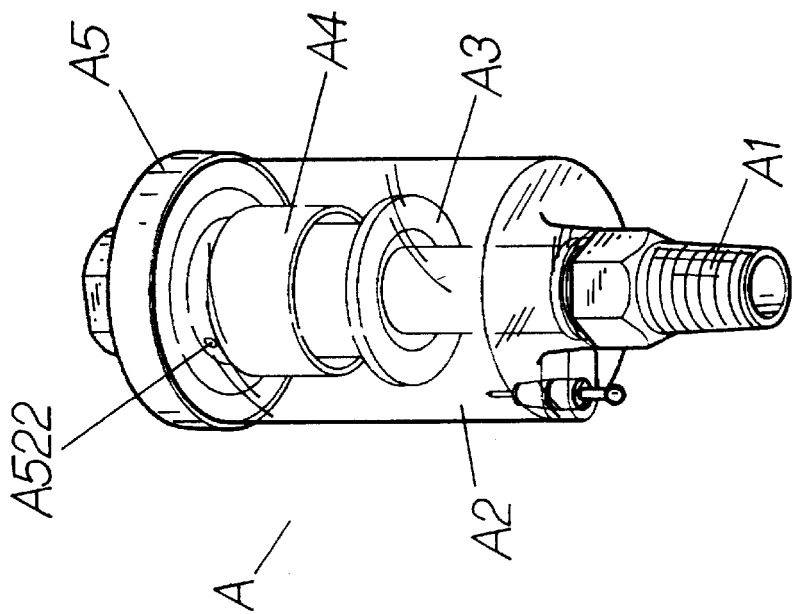
FIG.1-A
PRIOR ART
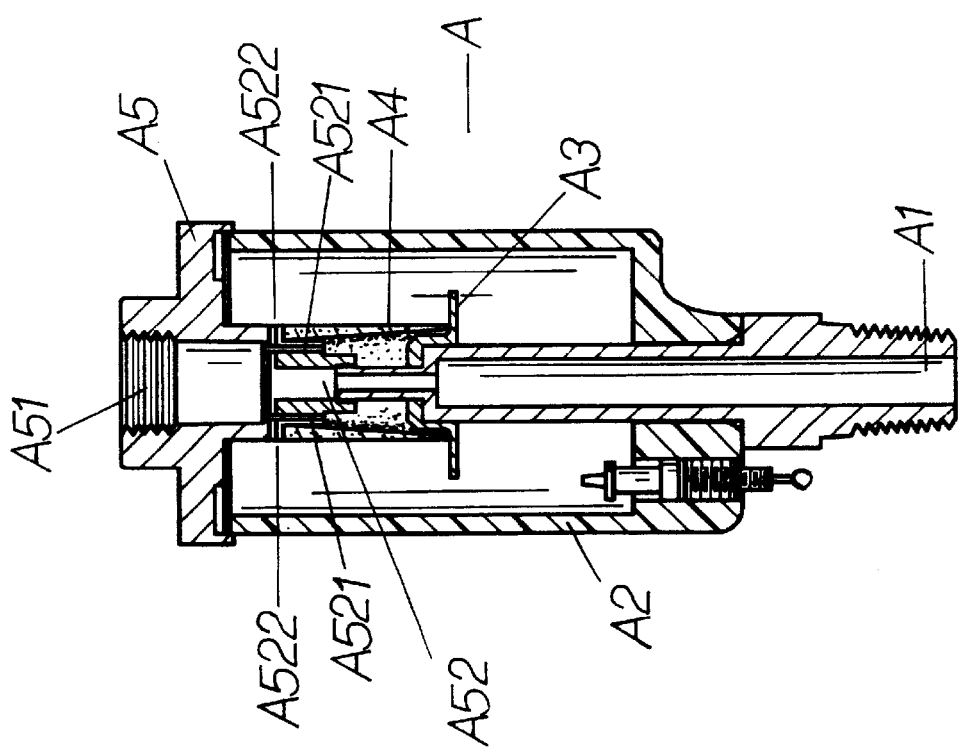
FIG.1-B
PRIOR ART

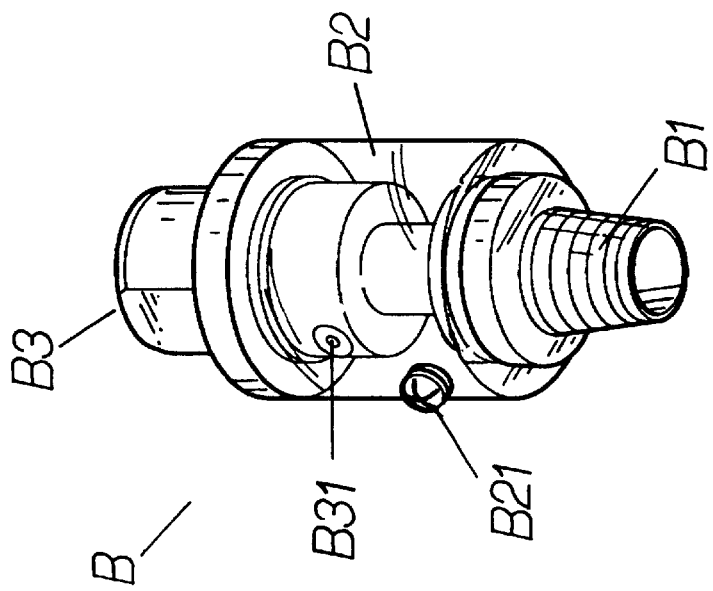
FIG. 2-A
PRIOR ART
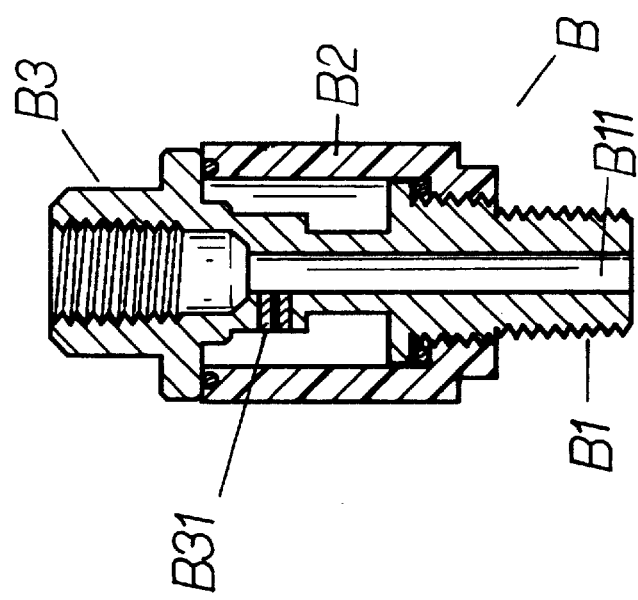
FIG. 2-B
PRIOR ART

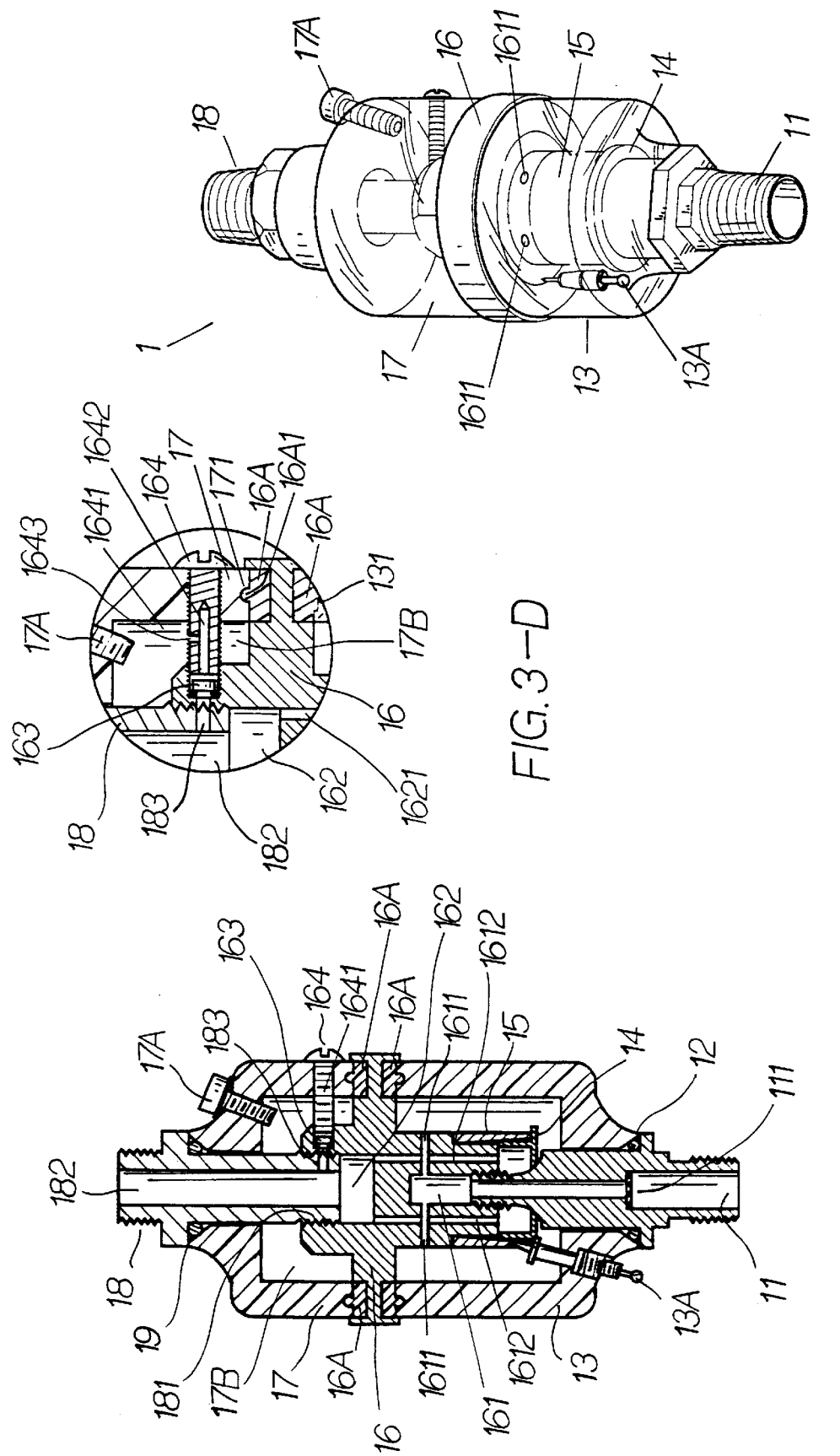

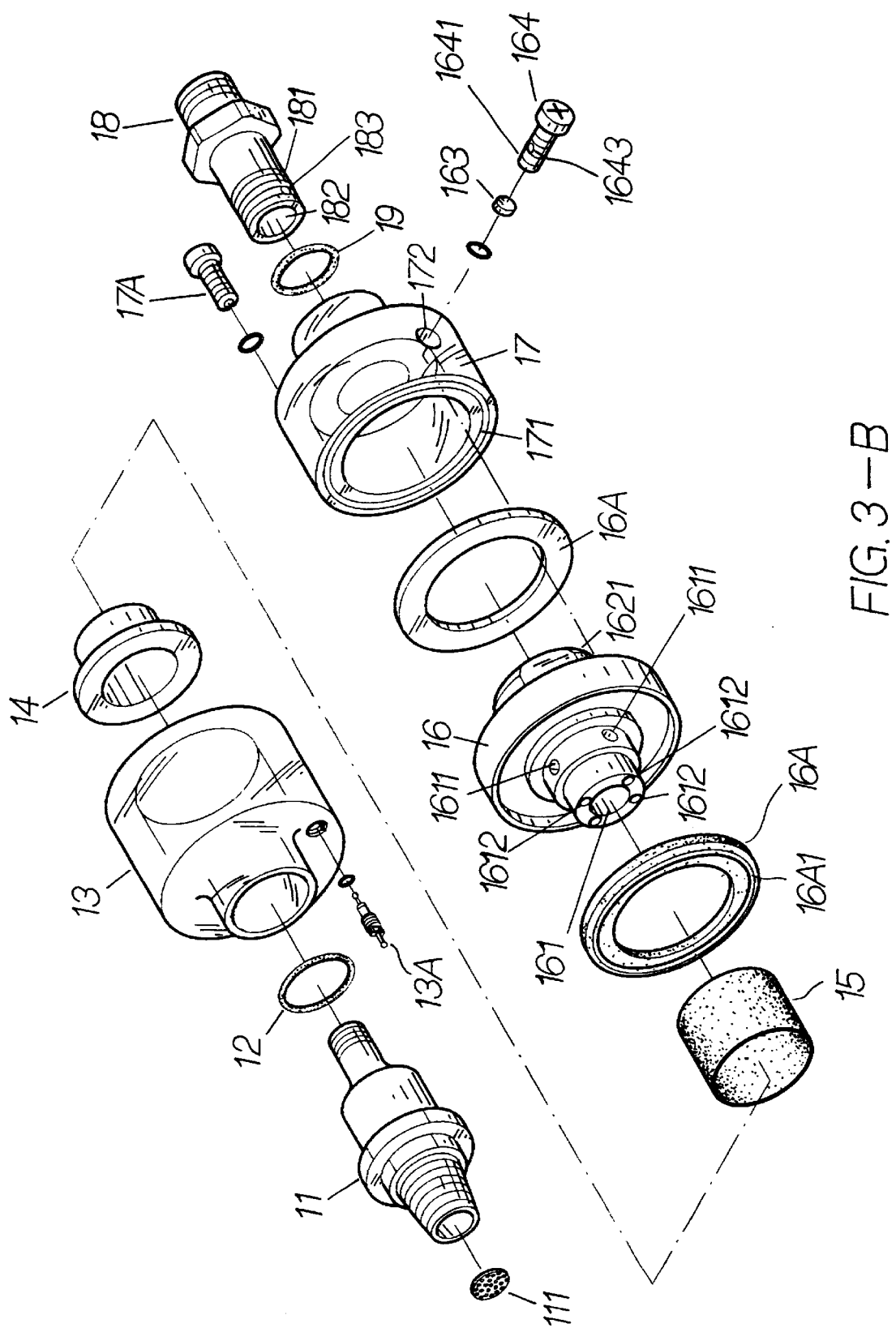
FIG. 3-B

FILTERING, WATER ELIMINATING, AND LUBRICATING COMPRESSED AIR VALVE STRUCTURE

BACKGROUND OF THE INVENTION

1. Field of the Invention

The invention herein relates to a filtering, water eliminating, and lubricating compressed air valve structure comprised of a compressed air valve installed between a conventional air compressor and a pneumatic tool. The present invention is capable of trapping free-floating particulate matter present in air and filtering our the water content to both clean and dry the air supplied into the said compressed air valve from the air compressor and then producing a mixture of the resulting air and lubricating oil to lubricate the components of a pneumatic tool and thereby enhance its mechanical operation. Furthermore, the compressed air valve is of the invention herein is also of reduced physical dimensions to facilitate installation and utilization.

2. Description of the Prior Art

Conventional compressed air valves installed between an air compressor and a pneumatic tool are typically comprised of two separate valve components, of which the structure of the water expelling valve component A, as indicated in FIG. 1-A and FIG. 1-B, is comprised of a lengthy cylindrically shaped condensate chamber A2 having an inserted air inlet fitting A1, enabling the tubular top of the air inlet fitting A1 to be ensleeved into the hollow T-shaped leakproof washer mount A3, wherein numerous minute holes are formed in the filter ring A4 around the hollow tubular extent of the leakproof washer mount A3; then, a cross-shaped connector A5 is installed to the opening of the condensate chamber A2 that seals the interior of the chamber and, furthermore, the throats A51 and A52 inside the connector A5 are of two different diameters, with the smaller throat A52 at the bottom having a vertical through-hole A521 in its side that is in continuity with the larger throat A51 situated above; a horizontal through-hole A522 is also drilled in the inner side of the smaller throat A52 and does not interface with vertical through hole A521 that extends into sealed region of the chamber A2. Threads are tapped along the inner walls of the larger throat A51 of the connector A5. When external air is compressed by the air compressor and delivered to the water expelling valve A, the compressed air enters the air inlet fitting A1, travels through the horizontal through-holes A522 along the inner sides of the smaller throat A52, and reaches the space of the surrounding condensate chamber A2. The compressed air in chamber A2 enables the action of the numerous minute pin holes of the filter ring A4 to collect any moisture contained and only allow a continuous flow of dry air through the through-holes A521 into the larger throat A51 at the top; as such, the said structure provides for the filtration of water content from the air delivered by the air compressor to supply dry air to and thereby maintain the normal operation and mechanical efficiency of the internal components comprising the pneumatic tool by preventing moisture-induced corrosion that results in abnormal operation or tool by preventing moisture-induced corrosion that results in abnormal operation or a deterioration of original mechanical precision.

The oil supply valve component B, as indicated in FIG. 2-A and FIG. 2-B, is comprised of a tubular connector B1 inserted into an oil reservoir B2 that is then capped by an internally threaded connector B3, of which a through-hole B31 is formed in the internally threaded connector B3, enabling continuity with the hollow passage B11 in the tubular connector B1, which is connected to a pneumatic tool; an oil injection screw B21 is installed in the bottom end of the condensate chamber B2, thereby providing for pressure relief and oil volume replenishment; when a flow of air is delivered to the hollow passage B11 in the tubular connector B1 of the oil supply valve component B, the oil volume is affected by the air flow moving past the through-hole B31 formed in the internally threaded connector B3, which results in the mixing of the lubricating oil in the air flow, followed by delivery of the mixture to the internal components of the pneumatic tool, enabling the internal components of the pneumatic tool to be adequately lubricated and utilized by the operator.

However, the said water expelling valve component A and oil supply valve component B are only capable of single practical function and, furthermore, when the air delivered by the air compressor contains free-floating particulates, the air inlet fitting A1 and the hollow passage B1, are easily clogged, which adversely affects normal operation and, therefore, must be frequently cleaned and inspected; additionally, inconvenient and troublesome utilization results because the through-hole B31 of the said oil supply valve component B cannot be adjusted to vary the oil volume.

In view of the said shortcomings, the inventor of the invention herein developed the filtering, water eliminating, and lubricating compressed air valve structure of the present invention and subsequently submitted the application for patent rights.

SUMMARY OF THE INVENTION

The primary objective of the invention herein is to provide a filtering, water eliminating, and lubricating compressed air valve structure installed between a conventional air compressor and a pneumatic tool such that when air is delivered to the said compressed air valve, free-floating particulate matter present in the air is screened first and then water is filtered out only allows dry air goes through, which is then mixed with lubricating oil to lubricate the components of a pneumatic tool and enhance its operation; furthermore, the compressed air valve of the present invention is also of reduced physical dimensions to facilitate actual installation and utilization.

To enable a further understanding of the structural innovations and operation of the present invention, the brief description of the drawings below are followed by the detailed description of the preferred embodiments.

BRIEF DESCRIPTION OF THE DRAWINGS

FIG. 1-A is an isometric drawing of a conventional water expelling valve component structure.

FIG. 1-B is a cross-sectional drawing of a conventional water expelling valve component structure.

FIG. 2-A is an isometric drawing of a conventional oil supply valve component structure.

FIG. 2-B is a cross-sectional drawing of a conventional oil supply valve component structure.

FIG. 3-A is an isometric drawing of the structure of the invention herein.

FIG. 3-B is an exploded drawing of the invention herein.

FIG. 3-C is a cross-sectional drawing of invention herein following assembly.

FIG. 3-D is cross-sectional drawing of the invention herein, as shown in a partial magnified view.

DETAILED DESCRIPTION OF THE PREFERRED EMBODIMENTS

Figure 4:
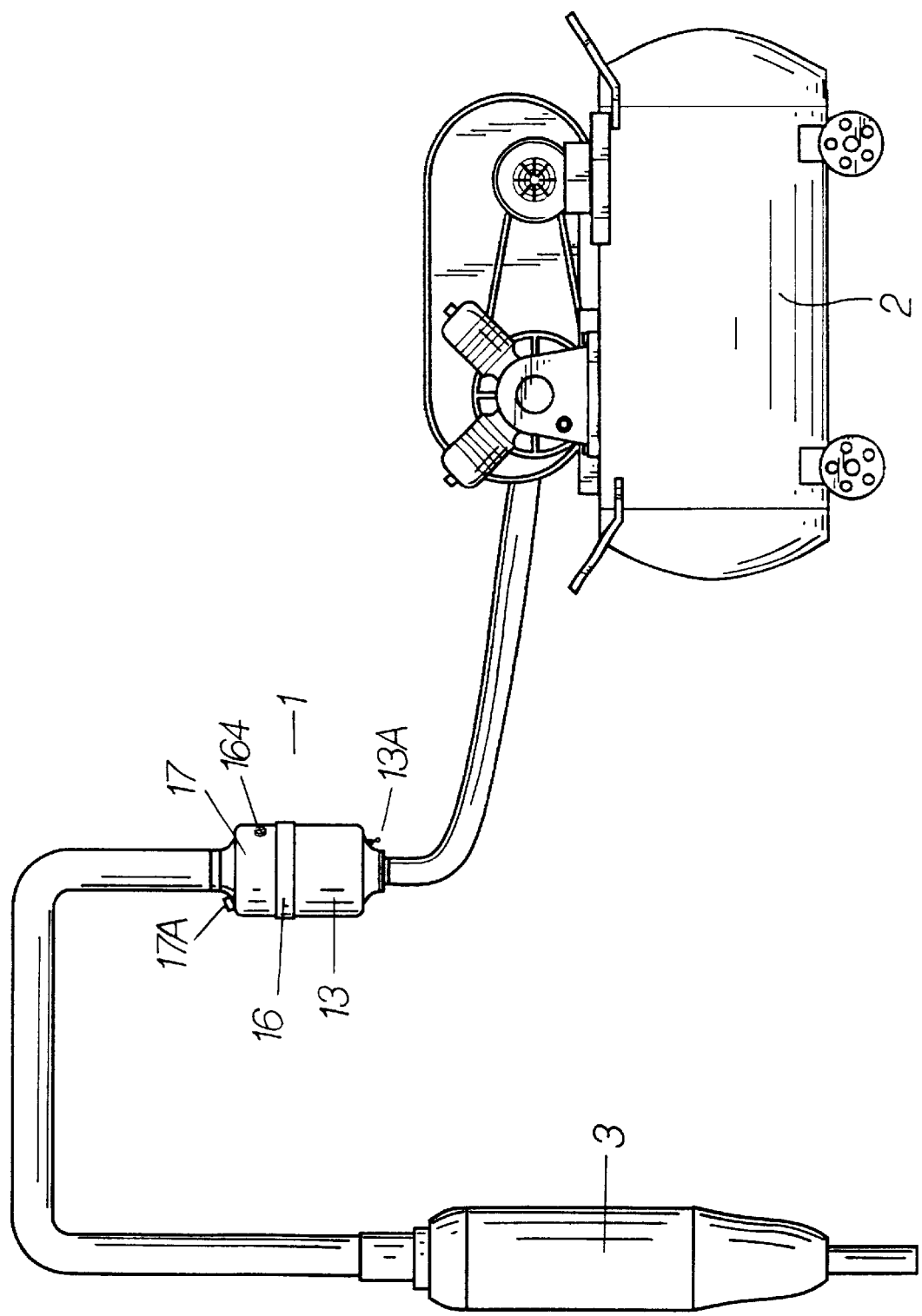
FIG. 4 is orthographic drawing of an embodiment of the invention herein.

Referring to FIG. 3-A, FIG.3-B, and FIG.3-C, the filtering, water eliminating and lubricating compressed air valve structure of the invention herein is comprised of a compressed air valve 1 installed between a conventional air compressor 2 and a pneumatic tool 3, as indicated in FIG. 4; an filter element 111 is positioned inside the air inlet fitting 11 of the said compressed air valve 1 such that after the O-ring 12 and the transparent condensate chamber 13 are installed over the air inlet fitting 11, the T-shaped washer mount 14 and the filter ring 15 are inserted over the bottom of the cross-shaped annular connector 16, of which the said filter ring 15 is fabricated with numerous minute holes, and the hollow neck 161 at the bottom of the cross-shaped annular connector 16 is in continuity with the air holes 1611 extending horizontally through its tubular circumferential wall, with the plurality of passages 1612 in the lower circumferential end of the hollow neck 161 of the cross-shaped annular connector 16 disposed in continuity with the throat 162 at the top and the threaded hole 1621 through the side and, furthermore, a movable circular element 163 is installed inside the threaded hole 1621, with the width of the movable circular element 163 being smaller than the inner diameter of the threaded hole 1621 such that the oil volume adjustment screw 164 can be fastened into the threaded hole 1621 after being inserted through the access hole 172 of the oil reservoir 17; furthermore, formed in a section of the threads 1641 of the oil volume adjustment screw is an oil inlet hole 1643 that is in continuity with the center passage 1642 (as shown in FIG. 3-D); a transparent oil reservoir 17 is also installed onto the upper half of the cross-shaped annular connector 16, with the oil reservoir 17 containing a lubricant 17B and, furthermore, an leakproof washer 16A is placed in between the condensate chamber 13 installed around the two ends of the cross-shaped annular connector 16 and the oil reservoir 17, and an annular lip 16A1 is formed on the said leakproof washer 16A that fits tightly into the aligned annular grooves 131 and 171 along the respective bottom ends of the condensate chamber 13 and the oil reservoir 17 to achieve a sealed closure; a threaded connector fitting 18 is situated above the throat 162 at the top of the cross-shaped annular connector 16, an oil fed hole 183 is drilled into a section of the lower threads 181 of the said threaded connector fitting 18 that is in continuity with its center bore 182 and, furthermore, an O-ring 19 is installed in between the threaded connector fitting 18 and the oil reservoir 17, and a relief needle valve 13A and an oil injection screw 17A are installed in the lowermost end of the said condensate chamber 13 and uppermost extent of the oil reservoir 17, respectively, to provide for the discharging of condensate and the replenishing of lubricant volume.

As such, following the assembly of the said structure, when the air supplied by the air compressor 2 is conveyed into the air inlet fitting 11 of the said compressed air valve 1, the filter element 111 first traps free-floating particulate matter present in the air and into the hollow neck 161 of the cross-shaped annular connector 16 (as shown in FIG. 3-C), The air travels through the horizontal then air holes 1611 of the cross-shaped annular connector 16 and is expelled into the condensate chamber 13, such that after the air is dried by passing through the numerous water eliminating minute holes in the surface of the filter ring 15, the air then enters the vertical passages 1612 in the side of the hollow neck 161 and travels into the throat 162 at the top, at which time the lubricant 17B in the oil reservoir 17 over the cross-shaped annular connector 16 is subjected to the flowing force of the dried air and consequently enters the oil inlet hole 1643 of the oil volume adjustment screw 164 and passes through the center passage 1642, after which the flowing air drives the movable circular element 163 to either open or close the threaded hole 1621 at the appropriate time and, furthermore, since the circumferential area of the movable circular element 163 is less than that of the inner diameter of the threaded hole 1621, the lubricant 17B enters the oil feed hole 183 in the side of the center bore 182 of the threaded connector fitting 18 and is mixed with the said flowing air in the throat 162 of the cross-shaped annular connector 16, thereby lubricating the components of the pneumatic tool 3 and enhancing its operation; in so functioning, the overall physical dimensions of the compressed air valve 1 is compact in size as well light in weight to facilitate easy installation and, furthermore, since the compressed air valve 1 is a single structure having the three functions of filtration, water elimination, and controlled volume lubrication, the present invention is capable of achieving its claimed objectives.

In summation of the foregoing section, since the filtering, water eliminating, and controlled volume lubricating compressed air valve structure of the invention herein complies with new patent application requirements the present invention is lawfully submitted to the patent bureau for review and the granting of the commensurate patent rights.

What is claimed is:

1. A filtering, water eliminating, and lubricating compressed air valve structure comprised of a compressed air valve installed between a conventional air compressor and a pneumatic tool; a filter element is positioned inside the air inlet fitting of the said compressed air valve such that after an O-ring and a transparent condensate chamber are installed over the said air inlet fitting, a T-shaped washer mount and a filter ring are inserted over the bottom of a cross-shaped annular connector, of which the said filter ring is fabricated with numerous minute holes and a hollow neck at the bottom of the said cross-shaped annular connector is in continuity with air holes extending horizontally through its tubular circumferential wall, with a plurality of passages in the lower circumferential end of the said hollow neck of the said cross-shaped annular connector disposed in continuity with a throat at the top and a threaded hole through the side such that an oil volume adjustment screw can be fastened into the said threaded hole after being inserted through an access hole of an oil reservoir, the said oil reservoir is transparent and also installed onto the upper half of the said cross-shaped annular connector, with the said oil reservoir containing a lubricant and, furthermore, a leakproof washer is placed in between the said condensate chamber installed around the two ends of the said cross-shaped annular connector and the said oil reservoir, and an annular lip is formed on the said leakproof washer that fits tightly into two aligned annular grooves along the respective bottom ends of the said condensate chamber and the said oil reservoir to achieve a sealed closure; a threaded connector fitting is situated above the said throat at the top of the said cross-shaped annular connector and an oil feed hole is drilled into a section of the lower threads of the said threaded connector fitting that is in continuity with its center bore and, furthermore, an O-ring is installed in between the said threaded connector fitting and the said oil reservoir, and a relief needle valve and an oil injection screw are installed in the lowermost end of the said condensate chamber and uppermost extent of the said oil reservoir, respectively, to provide for the discharging of condensate and the replenishing of lubricant volume; as such, following the assembly of the said structure, when the air supplied by the said air compressor is conveyed into the said air inlet fitting of the said compressed air valve and into the said hollow neck of the said cross-shaped annular connector is expelled into the said condensate chamber, such that after the air is dried by passing through the numerous water eliminating minute holes in the surface of the said filter ring, the air then enters the said passages in the side of the said hollow neck and travels into the said throat at the top, at which time the said lubricant in the said oil reservoir over the said cross-shaped annular connector is drawn by the flowing air and mixed with the said flowing air, thereby lubricating the components of the said pneumatic tool and enhancing its operation, while thereby enabling the said compressed air valve to be of compact dimensions and light in weight to facilitate installation as well as a single structure effectively capable of the three functions of filtration, water elimination, and lubrication.

2. As mentioned in claim 1 of the filtering, water eliminating, and lubricating compressed air valve structure of the invention herein, formed in a section of the threads of the said oil volume adjustment screw is an oil inlet hole that is in continuity with a center passage and, after being inserted through the said access hole of the said oil reservoir, the said oil volume adjustment screw is fastened into the said threaded hole in the side of the said throat at the top of the said cross-shaped annular connector, thereby subjecting the said lubricant in the said oil reservoir to the flowing force of the dried air, which draws it into the said oil inlet hole and the said center passage of the said oil volume adjustment screw and then into the said oil feed hole in the side of the said center bore of the said threaded connector fitting, where it is mixed with the said flowing air in the said throat of the said cross-shaped annular connector.

3. As mentioned in claim 1 of the filtering, water eliminating, and lubricating compressed air valve structure of the invention herein, a movable circular element smaller than the said threaded hole in the side of the said throat at the top of the said cross-shaped annular connector is installed inside the said threaded hole, with the said flowing air driving the said movable circular element to either open or close the said threaded hole at the appropriate time and thereby regulating the oil volume supplied into the said throat at the top of the said cross-shaped annular connector.

* * * * *